United States Patent
Komatsu et al.

(10) Patent No.: US 9,172,124 B2
(45) Date of Patent: Oct. 27, 2015

(54) PHOTOELECTRODE MATERIAL AND PHOTOCELL MATERIAL

(75) Inventors: Nobuaki Komatsu, Tokyo (JP); Tomoko Ito, Tokyo (JP); Hiroki Nagai, Hachiouji (JP)

(73) Assignee: IFTL-SOLAR INC., Tokyo (JP)

( * ) Notice: Subject to any disclaimer, the term of this patent is extended or adjusted under 35 U.S.C. 154(b) by 500 days.

(21) Appl. No.: 13/503,558

(22) PCT Filed: Oct. 21, 2010

(86) PCT No.: PCT/JP2010/068548
§ 371 (c)(1),
(2), (4) Date: May 22, 2012

(87) PCT Pub. No.: WO2011/049156
PCT Pub. Date: Apr. 28, 2011

(65) Prior Publication Data
US 2012/0241684 A1    Sep. 27, 2012

(30) Foreign Application Priority Data

| Oct. 21, 2009 | (JP) | 2009-242432 |
| Apr. 7, 2010 | (JP) | 2010-088571 |
| Sep. 15, 2010 | (JP) | 2010-206914 |
| Oct. 8, 2010 | (JP) | 2010-229129 |

(51) Int. Cl.
C09B 67/00    (2006.01)
H01C 13/00    (2006.01)
(Continued)

(52) U.S. Cl.
CPC ............ H01M 14/005 (2013.01); C25B 1/003 (2013.01); C25B 11/0452 (2013.01)

(58) Field of Classification Search
CPC . H01M 14/005; H01L 31/042; H01L 31/068; H01L 31/076; H01L 31/022425; B82Y 10/00

USPC .......... 252/182.1, 500, 501.1; 429/111, 213; 136/250, 255; 428/565, 566
See application file for complete search history.

(56) References Cited

U.S. PATENT DOCUMENTS

| 5,672,444 A | 9/1997 | Kuriyaki et al. |
| 6,153,824 A | 11/2000 | Takada et al. |

(Continued)

FOREIGN PATENT DOCUMENTS

| CN | 1797788 A | 7/2006 |
| EP | 1923896 A1 | 5/2008 |

(Continued)

OTHER PUBLICATIONS

Yuliati, L. et al., "Photoactive sites on pure silica materials for nonoxidative direct methane coupling", Journal of Catalysis, vol. 238, No. 1, Feb. 15, 2006, pp. 214-220, Cited in EP Office Action.

(Continued)

*Primary Examiner* — Khanh Tuan Nguyen
(74) *Attorney, Agent, or Firm* — Westerman, Hattori, Daniels & Adrian, LLP

(57) ABSTRACT

A photoelectric conversion material is obtained through easy processing from a substance containing silicon oxide, which is inexpensive, imposes no burden on the environment, and is stable, as a component. This material can be used in a photocell and a secondary photocell. Any of synthetic quartz, fused quartz glass, soda-lime glass, non-alkali glass, and borosilicate glass, which are compositions containing silicon oxide, is pulverized, immersed in an aqueous solution of halogen acid, washed with water, and dried. The resultant material is deposited on an electrode plate and this electrode plate is placed in water where an appropriate electrolyte is mixed. This electrode plate is electrically connected to an opposite electrode to provide a photoelectrode. The material may be enclosed in a container, mixed with an organic electrolyte, having an extraction electrode and an opposite electrode, to provide a photocell.

20 Claims, 2 Drawing Sheets

(51) Int. Cl.
  *H01M 14/00*   (2006.01)
  *C25B 11/04*   (2006.01)
  *C25B 1/00*    (2006.01)

(56) References Cited

U.S. PATENT DOCUMENTS

| 6,417,124 B1 | 7/2002 | Peuchert et al. |
| 2006/0110618 A1 | 5/2006 | Manivannan et al. |
| 2007/0042902 A1 | 2/2007 | Yazawa et al. |

FOREIGN PATENT DOCUMENTS

| JP | 9-63657 A | | 3/1997 | |
| JP | 11-265738 A | | 9/1999 | |
| JP | 2001-106546 A | | 4/2001 | |
| JP | 2001-243995 A | | 9/2001 | |
| JP | 2002-321907 A | | 11/2002 | |
| JP | 2004-196644 A | | 7/2004 | |
| JP | 2004-290747 | * | 10/2004 | ............... B01J 35/02 |
| JP | 2004-290747 A | | 10/2004 | |
| JP | 2004-290748 A | | 10/2004 | |
| JP | 2006-147559 A | | 6/2006 | |
| JP | 2007-098206 | * | 4/2007 | ............... B01J 35/02 |
| WO | 00/46154 A1 | | 8/2000 | |
| WO | WO2005/089941 A1 | | 9/2005 | |
| WO | 2006/095916 A1 | | 9/2006 | |

OTHER PUBLICATIONS

International Search Report of PCT/JP2010/068548, mailing date of Nov. 22, 2010.
John H. Kennedy et al., "Alpha-Fe2O3 Photoanodes Doped with Silicon", Journal of Electrochemical Society, vol. 127, No. 10, Oct. 1980, pp. 2307-2309.

* cited by examiner

PHOTOELECTRODE MATERIAL AND PHOTOCELL MATERIAL

FIELD OF INVENTION

The present invention relates to a photoelectrode material.

BACKGROUND ART

Generally, with respect to a reaction which cannot proceed without very high energy, for advancing such a reaction with extremely low energy, there is used a photocatalyst which causes an electron excitation state by irradiation with light.

As photocatalysts, there have been known so-called semiconductor catalysts, such as titanium oxide, zinc oxide, cadmium sulfide, and tungstic oxide, and metal complex catalysts, such as a ruthenium bipyridyl complex.

Among these photocatalysts, titanium oxide ($TiO_2$) is the most stable and substantially not biologically poisonous, and therefore is practically used as the photocatalyst for decomposing and removing nitrogen oxides and organic substances in air. However, for titanium oxide only the ultraviolet light having a wavelength of 380 nm or less can be used. The ultraviolet light in this region of wavelength is as small as 4% of the sunlight, and therefore titanium oxide achieves only the utilization efficiency for sunlight, which is the most abundant light source, 4% at the most, and practically at the most 1% thereof.

Typical examples of photocatalytic reactions of titanium oxide include reduction of $O_2$ (formation of $H_2O_2$), oxidation of $H_2O$ (generation of $O_2$), reduction of methylbiologen, reduction of $N_2$, drainage treatment, and a photocatalytic Kolbe reaction $\{CH_3COOH \rightarrow CH_4(gas)+CO_2\}$.

Titanium oxide has a photocatalytic ability as well as a photoelectrode ability to electrolyze water, which is known as a Honda-Fujishima effect, and a photovoltaic ability used in a solar cell.

JP-A-2004-290748 (Japanese Patent No. 4214221) and JP-A-2004-290747 (Japanese Patent No. 4247780) show fused quartz treated with a halogen acid as a material having a photocatalytic ability similar to that of titanium oxide.

International Publication No. WO2005/089941 shows synthetic quartz treated with hydrofluoric acid as a material having a photocatalytic ability.

This photocatalyst functions as a photocatalyst in a wavelength region of 200 to 800 nm, which is wider than the wavelength region for the photocatalyst using the fused quartz shown in JP-A-2004-290748 and JP-A-2004-290747.

With respect to the synthetic quartz treated with hydrofluoric acid, International Publication No. WO2005/089941 has, at paragraphs [0021] to [0023], the following description.

The synthetic quartz is activated by the treatment with hydrogen fluoride as mentioned above is explained as follows. When $SiO_2$ and HF are in contact with each other, Si on the surface is bonded to F, so that the bonded electrons are drawn toward the F side and the back bond is weakened. As a result, this site is attacked by the separated $H^+H^-$ molecules, and the back bond is cleaved, so that Si on the uppermost surface is fluorinated, and simultaneously one of the bonds in the layer immediately below the surface is hydrogenated.

The above state is successively transmitted, and Si on the uppermost surface is finally separated in the form of $SiF_4$, so that $SiH_3$ radicals remain on the surface.

In the $SiH_3$ radicals, however, the Si—Si bond between Si in the radical and Si in the next layer is very weak, and further the bonded electrons are weakly drawn toward the H side, and therefore the Si—Si bond is easily cleaved, so that Si is easily replaced by H in the HF molecules to give a form of SiH. Therefore, H is exposed on the Si (111) surface, thus causing an activated state.

The synthetic quartz treated with hydrogen fluoride is separated from the solution, and washed with distilled water 2 to 5 times, followed by air drying, to obtain the photocatalyst.

The synthetic quartz is activated by hydrogen fluoride as mentioned above, but natural quartz, which comprises the same crystalline silica, is not activated by hydrogen fluoride. The reason for this has not yet been elucidated.

International Publication No. WO2006/095916 shows zinc oxide, tin dioxide, tungsten oxide, and silicon carbide as semiconductor photoelectrode materials other than titanium dioxide used in the ultraviolet region.

Further, there are shown silicon, gallium arsenide, strontium titanate, cadmium selenide, and gallium phosphide as semiconductor photoelectrode materials used in the visible light region.

PRIOR ART REFERENCES

Document 1: JP-A-2004-290748
Document 2: JP-A-2004-290747
Document 3: International Publication No. WO2005/089941
Document 4: International Publication No. WO2006/095916

DISCLOSURE OF THE INVENTION

Object of the Invention

For the photoelectrode and the solar cell each using titanium oxide, only the ultraviolet light having a wavelength of 380 nm or less, which is contained as small as 4% in the sunlight, is used and therefore, it is low efficiency.

To widen the available range of the light by using a dye to the visible light region having the wavelength longer than that of the ultraviolet light, a dye-sensitized solar cell using a ruthenium complex dye is known as a Gratzel cell. The Gratzel cell has theoretically utilization efficiency of 30%, practically 10% at the most.

The ruthenium complex dye material is disadvantageous not only in that it is expensive, but also in that the dye decomposes during the use for a long term and that means a limitation of the lifetime.

Other dyes, particularly various types of organic dyes can be also used, but the organic dyes also have a limitation of the lifetime.

An object of the invention according to the present application is to provide a photoelectrode material and a solar cell material, which solve the problems accompanying the photoelectrode and solar cell using titanium oxide, and which are inexpensive and require no ruthenium complex dye material that is expensive and has a problem about the lifetime.

Means

The present inventors have found that synthetic quartz and fused quartz function as a photoelectrode material.

The present inventors have found that the synthetic quartz and fused quartz each treated with the halogen acid function as a photoelectrode material.

Further, the present inventors have found that the synthetic quartz and fused quartz each treated with the halogen acid function as a photocell material.

In addition, they have found that other glass including silicon oxide ($SiO_2$), i.e., soda-lime glass, non-alkali glass, and borosilicate glass also function as a photoelectrode material or a photocell material.

In the invention according to the present application, a material obtained by treating a silicon oxide composition with the halogen acid is used as a photoelectrode material or a photocell material.

The composition including silicon oxide used in the material is synthetic quartz.

The composition including silicon oxide used in the material is fused quartz glass.

The composition including silicon oxide used in the material is soda-lime glass.

The composition including silicon oxide used in the material is non-alkali glass.

The composition including silicon oxide used in the material is borosilicate glass.

The halogen acid used in the halogen acid treatment is hydrofluoric acid.

The halogen acid used in the halogen acid treatment is hydrochloric acid.

The use of the material is a photoelectrode.

The use of the material is a photocell.

DESCRIPTIONS OF THE INVENTION

The compositions of the materials used in the embodiments and the treatment therefor are as follows:

(1) synthetic quartz: Crystalline $SiO_2$
(2) Fused quartz glass: Amorphous $SiO_2$
(3) Soda-lime glass: $SiO_2$: 71.9%, CaO: 7.8%, $Al_2O_3$: 1.7%, MgO: 4.0%, $Na_2O$: 13.3%
(4) Non-alkali glass: $SiO_2$: 55.0%, CaO: 23.0%, $Al_2O_3$: 14.2%, $B_2O_3$: 6.2%
(5) Borosilicate glass: $SiO_2$: 33.0%, CaO: 6.8%, $Al_2O_3$: 1.3%, $B_2O_3$: 37.4%, MgO: 5.5%, $Na_2O$: 16.0%.

The description of the components having a content of less than 1% is omitted.

The above glass sample is immersed in an aqueous solution of hydrofluoric acid, and washed with water and then dried, and pulverized.

Other than hydrofluoric acid, hydrochloric acid is used as the halogen acid, but hydrofluoric acid is preferred.

Other halogen acids are considered to be able to be used.

It has been confirmed that a glass sample which is not treated with the halogen acid also functions as a photoelectrode material.

A fluorescent light is used as an indoor light source, and the illuminance obtained in that case is 15,000 to 19,000 lux.

With respect to an outdoor light, the illuminance of 6,000 to 7,000 lux can be obtained in the shade, and the illuminance of about 50,000 to 100,000 lux can be obtained from the sunlight.

Embodiment 1

An example of the photoelectrode is first described.

An apparatus utilizing the photoelectrode ability of the halogenation treated glass is described with reference to FIG. 1.

Figure 1:
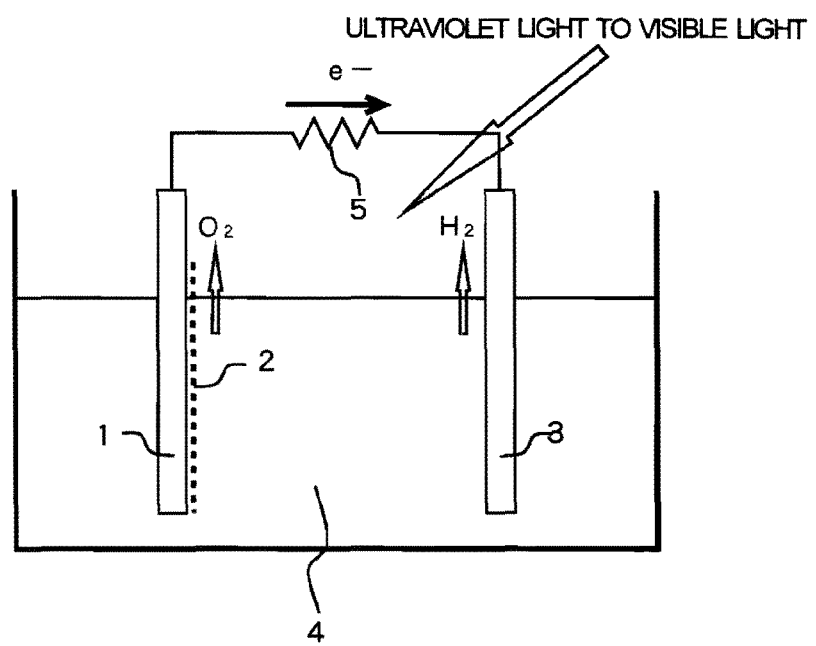
FIG. 1 shows an arrangement in principle of a water photo electrolysis apparatus using the photoelectrode material according to the present invention.

In FIG. 1, the reference numeral 1 represents an anode; 2 a photoelectrode material supported by the anode 1; 3 a cathode; 4 water mixed therein an appropriate electrolyte; and 5 a load connected between the anode 1 and the cathode 3.

The anode 1 is formed from Ni/NiO or a noble metal, and supports thereon the photoelectrode material 2. The size of the anode is 20 mm×20 mm.

The above glass sample is immersed in the 5% aqueous solution of hydrofluoric acid for 5 minutes, and washed with water and then dried, and pulverized so that the diameter of the resultant particles becomes 0.2 mm or less.

As the cathode 3, for example, platinum or carbon is used.

As the load 5, a resistor is used.

When the photoelectrode material 2 is irradiated with a light at 200 to 800 nm wavelength and the light is absorbed by the photoelectrode material, charge separation occurs in the photoelectrode material, and the resultant state has a certain lifetime, so that electrons react with and reduce water to form $H_2$ and positive holes oxidize water to form $O_2$.

Thus hydrogen and oxygen are generated and simultaneously, electrons flow from the cathode 3 toward the anode 1 through the load 5, namely, a current flows from the anode 1 toward the cathode 3.

Using the electrode 1 having an area of 20×20 $mm^2$ and a 0.5 mol/L electrolytic solution obtained by dissolving 0.71 g of $Na_2SO_4$ in 10 mL of pure water, a current flowing when irradiated with a light at 15,000 to 19,000 lux using a fluorescent light is shown in Table 1.

Further, the amount of the hydrogen gas generated by electrolysis of water, which is determined by making a calculation from the above-obtained current value, is also shown.

TABLE 1

| photoelectrode materials | current (μA) | hydrogen gas (μL) |
|---|---|---|
| synthetic quartz | 0.2 | 0.84 |
| fused quartz glass | 0.1 | 0.42 |
| soda-lime glass | 0.1 | 0.42 |
| non-alkali glass | 0.1 | 0.42 |
| borosilicate glass | 0.1 | 0.42 |

Embodiment 2

Using hydrochloric acid as the halogen acid treatment and an aqueous solution of sodium sulfate as an electrolytic solution, a synthetic quartz electrode causes a current of 0.1 μA to flow.

From a calculation, the amount of hydrogen obtained by electrolysis at the above current is 0.42 μL per hour.

Embodiment 3

Next, an example of the photocell is described.

Figure 2:
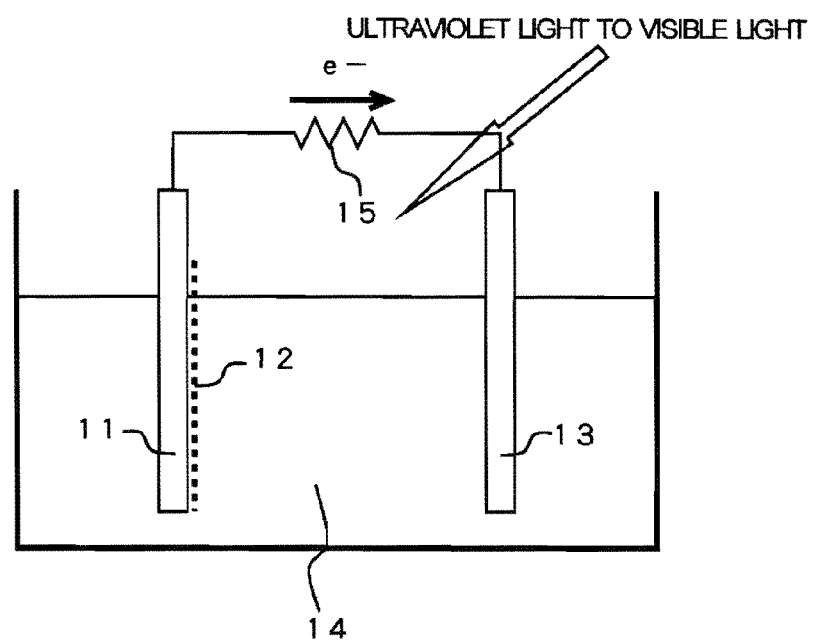
FIG. 2 shows an arrangement in principle of a photocell using the photocell material according to the present invention.

FIG. 2 shows a schematic view of the photocell arrangement according to the invention.

In FIG. 2, the reference numeral 11 represents an electrode; 13 a counter electrode; 12 a photoelectrode supported by the electrode 11; 14 an electrolytic solution; and 15 a load connected between the electrode 11 and the counter electrode 13.

The electrode 11 is formed from Ni/NiO or a noble metal, and supports thereon the photoelectrode material 12 comprising $SiO_2$.

There is used a photoelectrode obtained by immersing grains of glass comprising $SiO_2$ or the like in a 5% aqueous solution of hydrofluoric acid for 5 minutes and washing them with water and then drying them, and pulverizing them so that the diameter of the resultant particles becomes 0.2 mm or less.

As the counter electrode 13, for example, platinum or carbon is used, and, as the load 15, a resistor is used.

When the photoelectrode 12 is irradiated with the light having the wavelength of 200 to 800 nm and the light is absorbed by the photoelectrode, electricity is generated in the photoelectrode 12 and electrons flow from the electrode 11 toward the counter electrode 13 through the load 15. Namely, a current flows from the counter electrode 13 towards the electrode 11.

Embodiment 4

Next, a specific arrangement of the photocell is described.

Figure 3:
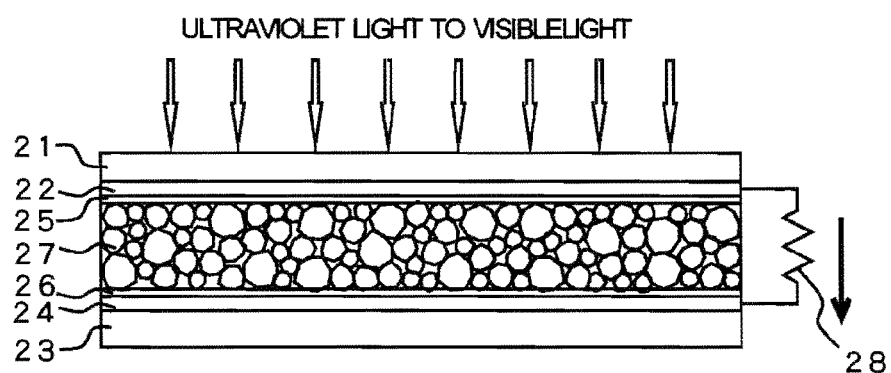
FIG. 3 shows the specific arrangement of the photocell.

FIG. 3 shows a schematic view of the photocell according to the present invention.

In FIG. 3, the reference numerals 21 and 23 represent 30 mm×30 mm glass substrates having, respectively, an FTO (fluorine-doped tin oxide) layer 22 and an FTO layer 24, and the FTO layer 22 and the FTO layer 24 function as a charge extraction electrode. An n-type semiconductor layer of zinc oxide (ZnO), titanium oxide ($TiO_2$) or the like, is formed on the FTO layer where the light enters.

A 20 mm×20 mm platinum film 26 is formed on the FTO layer 24 opposite to the FTO where the light enters.

A photocell material 27 having the thickness of 0.15 to 0.20 mm, where glass comprising $SiO_2$ and an organic electrolyte are mixed, is enclosed between the n-type semiconductor layer 25 and the platinum film 26.

The organic electrolyte by adding 0.1 mol of LiI, 0.05 mol of $I_2$, 0.5 mol of 4-tert-butylpyridine, and 0.5 mol of tetrabutylammonium iodide to 0.5 mol acetonitrile solvent is used.

An extraction line is attached to the FTO layer 22 and FTO layer 24, which are extraction electrodes for the photocell, thus prepared, and the extraction electrode 22 side is irradiated with the light of the illuminance of 15,000 to 19,000 lux using a fluorescent light as a light source, and an open-circuit voltage and a short-circuit current between the extraction electrodes 22 and 24 were measured.

The open-circuit voltage and short-circuit current obtained as a result are shown in Table 2.

TABLE 2

| photoelectric materials | open-circuit voltage (mV) | short-circuit current (µA) |
|---|---|---|
| synthetic quartz | 35 | 0.5 |
| fused quartz glass | 30 | 0.5 |
| soda-lime glass | 15 | 0.3 |
| non-alkali glass | 30 | 0.4 |
| borosilicate glass | 14 | 0.3 |

Embodiment 5

On the silicon oxide composition which is not treated with hydrofluoric acid, the open-circuit voltage and the short-circuit current shown in Table 3 are obtained.

TABLE 3

| photoelectric materials | open-circuit voltage (mV) | short-circuit current (µA) |
|---|---|---|
| synthetic quartz | 3 | 0.1 |
| fused quartz glass | 3 | 0.2 |
| soda-lime glass | 5 | 0.1 |
| non-alkali glass | 5 | 0.1 |
| borosilicate glass | 12 | 0.2 |

On the glass fiber treated with hydrofluoric acid at the concentration of 0.1%, the voltage of 26 mV is detected.

From the above results, it has been found that $SiO_2$ has a function of a photocell and the $SiO_2$ treated with hydrofluoric acid exhibits a remarkably increased photovoltaic voltage.

Further, on the borosilicate glass, a voltage as high as 12 mV is detected even when it is not treated with hydrofluoric acid, and it is considered that such the high voltage may be caused due to the presence of boric acid ($B_2O_3$).

Embodiment 6

When using hydrochloric acid instead of halogen acid for the treatment and the organic electrolyte by adding 0.1 mol of LiI, 0.05 mol of $I_2$, 0.5 mol of 4-tert-butylpyridine, and 0.5 mol of tetrabutylammonium iodide to acetonitrile solvent, the obtained open-circuit voltage is 4 mV, and the obtained short-circuit current is 0.1 µA.

Embodiment 7

With respect to the synthetic quartz, it is measured at the illuminance substantially equivalent to that of sunlight using an incandescent lamp at 300 W, which is a light source containing no component of an ultraviolet region. As a result, the open-circuit voltage of 400 mV and the short-circuit current of 0.5 µA are obtained.

This result has confirmed that at least the synthetic quartz enables a photovoltaic action using the light having the wavelength longer than that of the ultraviolet light and the resultant electromotive force is not caused by titanium oxide.

Therefore, even higher open-circuit voltage and larger short-circuit current are expected when further adding a titanium oxide film which has conventionally been studied for a solar cell.

REFERENCE NUMERALS

1, 11: Electrode
2, 12: Photoelectrode material
3, 13: Counter electrode
4, 14: Electrolyte
5, 15: Load
21, 23: Glass substrate
22, 24: Extraction electrode
25: n-Type semiconductor layer
26: Platinum film
27: Silicon oxide

The invention claimed is:

1. A photoelectrode comprising silicon oxide and an electrode material coupled to the silicon oxide in a manner that generates an electric current in response to light irradiation to the photoelectrode.

2. The photoelectrode according to claim 1, wherein said silicon oxide is synthetic quartz.

3. The photoelectrode according to claim 1, wherein said silicon oxide is fused quartz glass.

4. The photoelectrode according to claim 1, wherein said silicon oxide is soda-lime glass.

5. The photoelectrode according to claim 1, wherein said silicon oxide is non-alkali glass.

6. The photoelectrode according to claim 1, wherein said silicon oxide is borosilicate glass.

7. The photoelectrode according to claim 1, wherein said silicon oxide is glass fiber.

8. The photoelectrode according to claim 1, wherein said silicon oxide has been treated with halogen acid.

9. The photoelectrode according to claim 8, wherein said halogen acid is hydrofluoric acid.

10. The photoelectrode according to claim 8, wherein said halogen acid is hydrochloric acid.

11. A photocell comprising:
a photoelectrode comprising silicon oxide and a first electrode material coupled to the silicon oxide; and
a second electrode material electrically coupled to the photoelectrode.

12. The photocell according to claim 11, wherein said silicon oxide is synthetic quartz.

13. The photocell according to claim 11, wherein said silicon oxide is fused quartz glass.

14. The photocell according to claim 11, wherein said silicon oxide is soda-lime glass.

15. The photocell according to claim 11, wherein said silicon oxide is non-alkali glass.

16. The photocell according to claim 11, wherein said silicon oxide is borosilicate glass.

17. The photocell according to claim 11, wherein said silicon oxide is glass fiber.

18. The photocell according to claim 11, wherein said silicon oxide has been treated with halogen acid.

19. The photocell according to claim 18, wherein said halogen acid is hydrofluoric acid.

20. The photocell according to claim 18, wherein said halogen acid is hydrochloric acid.

* * * * *